United States Patent
Lemons et al.

(10) Patent No.: US 9,549,566 B2
(45) Date of Patent: Jan. 24, 2017

(54) PROCESSED CAULIFLOWER AND CAULIFLOWER PROCESSING METHOD

(71) Applicant: Growers Express, LLC, Salinas, CA (US)

(72) Inventors: Kel Eugene Lemons, Placerville, CA (US); Brian Stepien, Carmel, CA (US)

(73) Assignee: Growers Express, LLC, Salinas, CA (US)

( * ) Notice: Subject to any disclaimer, the term of this patent is extended or adjusted under 35 U.S.C. 154(b) by 0 days.

(21) Appl. No.: 14/938,557

(22) Filed: Nov. 11, 2015

(65) Prior Publication Data

US 2016/0309750 A1    Oct. 27, 2016

Related U.S. Application Data (60) Provisional application No. 62/152,867, filed on Apr. 25, 2015.

(51) Int. Cl.
| | |
|---|---|
| A23L 1/015 | (2006.01) |
| A23L 1/212 | (2006.01) |
| A23B 7/00 | (2006.01) |

(52) U.S. Cl.
CPC .................. *A23L 1/015* (2013.01); *A23B 7/00* (2013.01); *A23L 1/2123* (2013.01); *A23L 19/03* (2016.08); *A23V 2002/00* (2013.01)

(58) Field of Classification Search
CPC .......... A23L 1/015; A23L 1/2123; A23L 9/03; A23B 7/00; A23P 10/00
See application file for complete search history.

(56) References Cited

U.S. PATENT DOCUMENTS

| | | | | |
|---|---|---|---|---|
| 3,814,820 A | * | 6/1974 | Busta | A23B 7/157 426/262 |
| 5,492,705 A | * | 2/1996 | Porchia | B65D 33/01 383/103 |

(Continued)

FOREIGN PATENT DOCUMENTS

| | | | | |
|---|---|---|---|---|
| CN | 102599232 A | * | 7/2012 | |
| KR | 20130059037 | * | 6/2013 | |
| WO | WO 2013118726 A1 | * | 8/2013 | ........... A23L 1/2121 |

OTHER PUBLICATIONS

Alyssa "How to Make Cauliflower 'Rice" Feb. 12, 2013 and posts to Feb. 2014 pp. 1-23 http://www.everydaymaven.com/2013/how-to-make-cauliflower-rice/.*

(Continued)

*Primary Examiner* — Kelly Bekker
(74) *Attorney, Agent, or Firm* — Oblon, McClelland, Maier & Neustadt, L.L.P.

(57) ABSTRACT

A cauliflower processing comprises pre-washing a cauliflower, including removing unwanted dust, residual, and debris from the cauliflower. Further, the method includes a step for washing the cauliflower with a wash solution containing at least one of sodium hypochlorite, calcium hypochlorite, organic acids, chlorine dioxide, silver ion, water treated with ozone, water treated with pulsed electric field, and water treated with ultraviolet radiation. Finally, the method includes a step for pulverizing the cauliflower, including at least one of the steps of sizing, grinding, sanding, cutting, dicing, chopping, and crushing the cauliflower.

15 Claims, 7 Drawing Sheets

(56) References Cited

U.S. PATENT DOCUMENTS

2013/0337122 A1* 12/2013 Falquerho ................ A23B 7/02
426/250
2015/0132438 A1* 5/2015 Chang ................... A23L 1/2128
426/62

OTHER PUBLICATIONS

USARice "Types of Rice" p. 1 Jan. 5, 2014 http://riceinfo.com/all-about-rice/types-of-rice/.*

* cited by examiner

PROCESSED CAULIFLOWER AND CAULIFLOWER PROCESSING METHOD

CROSS-REFERENCE TO RELATED APPLICATIONS

This patent application is based on and claims priority to U.S. Provisional Patent Application No. 62/152,867, filed on Apr. 25, 2015, the entire contents of which are hereby incorporated by reference herein.

BACKGROUND

Field of the Disclosure

The present disclosure describes processed cauliflower and methods of processing cauliflower.

Description of the Related Art

Raw prepared cauliflower packaged sales are currently estimated to be over $200 million dollars per year with a loss of 21% to the consumer due to cauliflower stem rejection, representing approximately $43 million in losses for consumers due to looks rather than due to function, nutrition or organoleptic properties. There is a need to improve upon the related art in the field of processing and packaging of raw vegetables, including cauliflower.

SUMMARY

The present disclosure is directed to a method for processing cauliflower, the method comprising pre-washing a cauliflower, including removing unwanted dust, residual, and debris from the cauliflower; washing the cauliflower with a wash solution containing at least one of sodium hypochlorite, calcium hypochlorite, organic acids, chlorine dioxide, silver ion, water treated with ozone, water treated with pulsed electric field, and water treated with ultraviolet radiation; and pulverizing (sizing) the cauliflower, including at least one of the steps of cutting, grinding, sanding, and crushing the cauliflower;

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numerals designate identical or corresponding parts throughout the several views.

Further, as used herein, the words "a", "an" and the like generally carry a meaning of "one or more", unless stated otherwise.

Referring now to the drawings, wherein like reference numerals designate identical or corresponding parts throughout the several views.

Figure 1A:
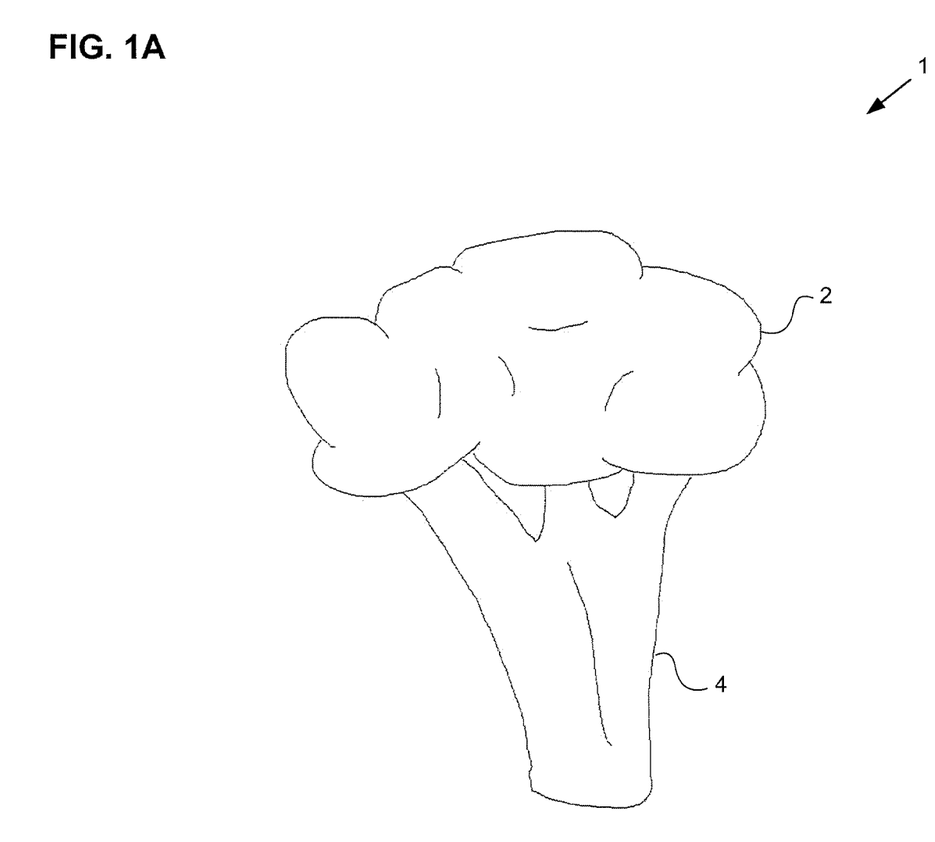
FIGS. 1A-1B are drawings of a head of cauliflower.
Figure 1B:
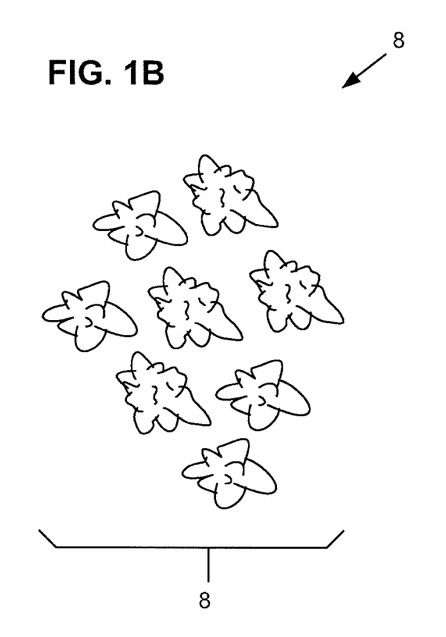

FIGS. 1A-1B are drawing of a cauliflower 1, including a crown portion 2 connected to a cauliflower stem 4. Further, all references to the cauliflower 1 below include a pulverized cauliflower 8 form (FIG. 1B). As noted above, considerable loss is incurred when the consumer rejects the cauliflower stem 4. Accordingly, the processes described below aim to minimize this loss by processing the cauliflower stem 4 along with the crown portion 2 such that the processed cauliflower stem 4 resembles the processed crown portion 2. For example, the processed cauliflower stem 4 resembles the crown portion 2 in one or more of texture, size, visual appearance, color, density, and how the processed cauliflower stem 4 and the processed crown portion 2 are blended, mashed, or otherwise physically incorporated into one another as a food ingredient. Thus, the processed cauliflower stem 4 and the processed cauliflower crown 2 are indistinguishable in appearance and consistent in the way they blend, mash, cook, taste, appear and otherwise perform, thereby resulting in less waste, less preparation time, and savings to the consumer, the producer, and the environment.

Figure 2A:
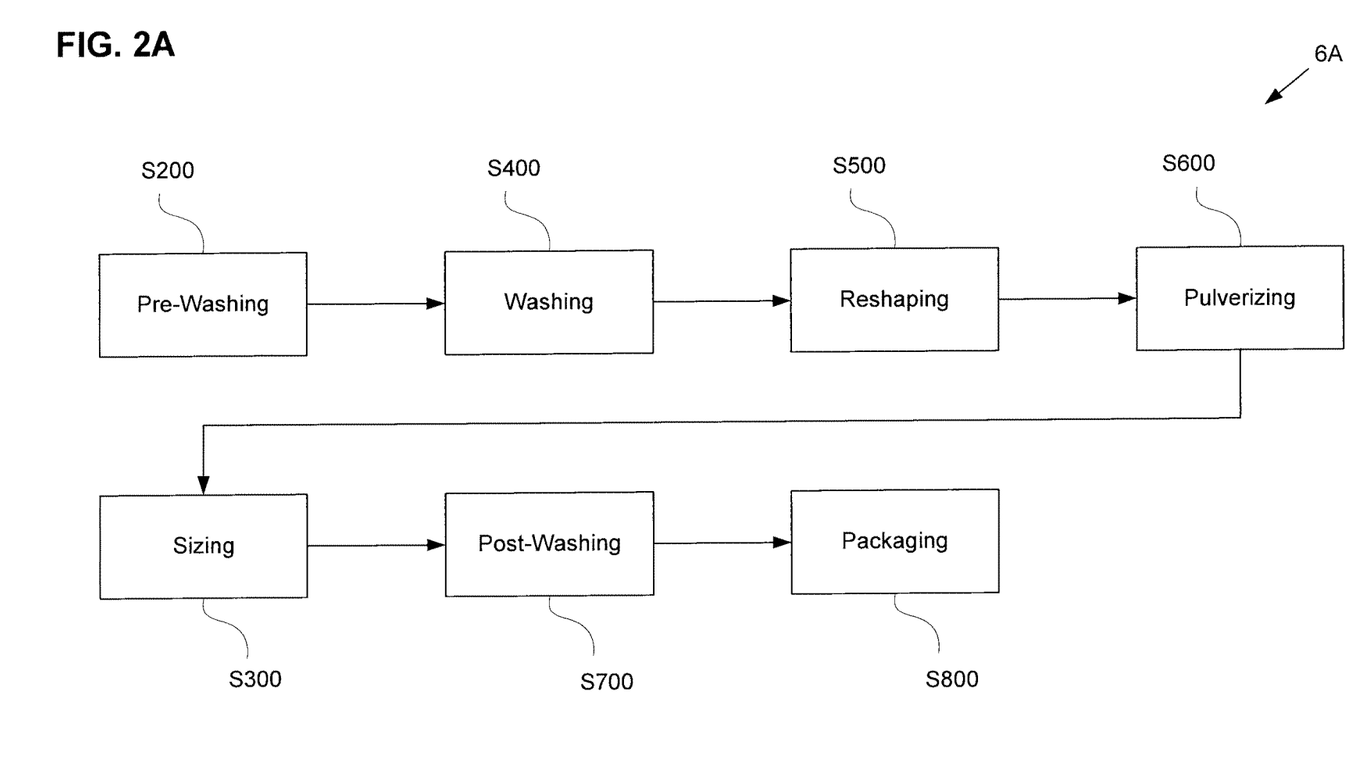
FIG. 2A is a diagram representing a sequence of primary processes of a cauliflower processing method.

FIG. 2A is a diagram representing a sequence of primary processes of a cauliflower processing method 6A. The cauliflower processing method 6A includes a pre-washing process S200, a washing process S400, a reshaping process S500, a pulverizing (sizing) process S600, a sizing process S300, a post-washing process S700, and a packaging process S800.

S200 represents a process of pre-washing the cauliflower 1, which may include steps related to removing unwanted dust, residual, debris and quality defects. Further, the process may include application of whiteners, anti-microbial rinses and coatings to enhance appearance and/or shelf life, application of physical coating(s) to adhere other materials such as cheese, oils, vinegar, malt, flavorings, extracts, essences and preservatives to the cauliflower 1 and/or steps for slicing, cutting, chopping, and dicing of the cauliflower 1, which may include at least one of sizing, grinding, sanding, and crushing steps.

S400 represents a process of washing, sanitizing and/or further removing debris from the cauliflower 1 (collectively, "washing"). S400 may include washing the cauliflower 1 in a chlorinated wash solution with proprietary silicate treatment ("wash solution"), whereby the wash solution applied to the cauliflower 1 using one of a number of washing methods, including without limitation, a belt and spray mechanism or a flume-type, tube-type or other bathing, submersion or rinsing mechanism. S400 may also include application of whiteners, anti-microbial rinses and coatings to enhance appearance and/or shelf life, and/or application of physical coating(s) to adhere other materials to the cauliflower 1 such as cheese, oils, vinegar, malt, flavorings, extracts, essences and preservatives.

In another example, the cauliflower 1 is washed using a wash solution containing sodium hypochlorite.

In another example, the cauliflower 1 is washed using a wash solution containing calcium hypochlorite.

In another example, the cauliflower 1 is washed using a wash solution containing organic acids.

In another example, the cauliflower 1 is washed using a wash solution containing chlorine dioxide.

In another example, the cauliflower 1 is washed using a wash solution containing silver ion.

In another example, the cauliflower 1 is washed using water treated with ozone.

In another example, cauliflower 1 is washed using water treated with pulsed electric or magnetic field.

In another example, the cauliflower 1 is washed using water treated with ultraviolet radiation.

S500 represents a process of reshaping the cauliflower 1. Reshaping may be performed, depending on limitations present in the machinery used in the cauliflower processing method 6A, and includes halving, quartering or otherwise reshaping the cauliflower 1.

In another example the reshaping process S500 is not included in the cauliflower processing method 6A.

S600 represents the process of pulverizing (sizing) cauliflower 1 such that the cauliflower stem 4 and crown portion 2 are broken down into the desired size pieces. In one example, the cauliflower 1 is pulverized to pieces having a volume of 1500 mm$^3$ or less. The pulverizing (sizing) process may include at least one of grinding, cutting, slicing, chopping, dicing, sanding, and crushing of the cauliflower.

S600 may also include application of whiteners, antimicrobial rinses and coatings to enhance appearance and/or shelf life, and/or application of physical coating(s) to adhere other materials to the cauliflower 1 being pulverized such as cheese, oils, vinegar, malt, flavorings, extracts, essences and preservatives.

In one example, the pulverizing (sizing) process includes the use of rotary hammer and anvil to crush the cauliflower 1 into proper sizes, shapes, visual and tactile appearance.

In another example, the pulverizing (sizing) process includes the use of ceramic sanding balls to sand the outer skin of the cauliflower 1 into proper sizes, shapes, visual and tactile appearance.

In another example, the pulverizing (sizing) process includes the use of a ceramic grinding stone to grind the outer skin of the cauliflower 1 into proper sizes, shapes, visual and tactile appearance.

In another example, the pulverizing (sizing) process includes the use of high pressure water jets to score and break the cauliflower 1 into proper sizes, shapes, visual and tactile appearance.

In another example the pulverizing (sizing) process includes a hydraulic fracturing process composed of a high pressure step then an instantaneous vacuum step leading to a popcorn effect on the whole of the cauliflower 1 to improve the visual and tactile appearance.

As a result of pulverizing (sizing), the cauliflower 1 is broken down into pieces having a size of approximately a maximum 1500 mm$^3$ to approximately a minimum of 15 mm$^3$.

In another example, the pulverizing cauliflower 1 is broken down into pieces having a size of approximately 250 mm$^3$ plus or minus 50 percent. The pulverizing (sizing) process S600 can also include a spice admix step to embody the spices into the outer skin of the cauliflower 1 prior to post washing using vacuum or other methods of infusion.

The pulverizing (sizing) process S600 can also include a physical coating step to adhere other materials such as cheese, oils, vinegar, malt, flavorings, extracts, essences and preservatives into the outer skin of the cauliflower 1 prior to post washing.

Additionally, prior to the pulverizing (sizing) process S600 or as part of the pulverizing (sizing) process S600, the processing method 6A may include a marking step to notch the smooth ends and sides of the cauliflower 1 using methods including without limitation, texture mats, cutting blades or instruments, pressure rolling or stamping, sanding, grinding, or high pressure water of the cauliflower stem 4 to mimic the visual and tactile effects of the crown portion 2 of the cauliflower 1 prior to entering at least one of a grinding, sanding, or crushing step of the pulverizing (sizing) process S600.

S300 represents an optional process for sizing the cauliflower 1. The sizing process S300 is optional and, in certain embodiments, the other steps of the processing method 6A depicted in FIG. 2A are performed without the sizing process S300. The sizing process includes gauging the cauliflower 1 through at least one of the steps of using a screen, rotary screen, vibratory screen, camera visual inspection, and automatically through robotic feeler gauges to ascertain the dimensions of the cauliflower 1. Further, the sizing process S300 may be performed at any point in the process of method 6A prior to packaging. In this example, it occurs after the pulverizing (sizing) process S600. In another example, the sizing process S300 may be performed prior to the washing process S400.

S700 represents a process of post-washing, sanitization, coating and/or treatment (collectively, "post-washing" or "post wash") of the cauliflower 1 to increase the brightness, enhance shelf life and food safety, and regulate, maintain or otherwise optimize moisture content of the cauliflower 1. In one embodiment there may include a post-washing process to remove unwanted small particles of the cauliflower 1 and provide antimicrobial treatment.

For example, one example of a post-washing step includes washing the pulverized cauliflower 8 with a wash that contains antimicrobials, preservatives and whiteners to maintain and possibly increase the brightness, moisture content, food safety, shelf life and preservation of the cauliflower 1.

In another example, the post-washing process may include a chemical coating step to improve and increase shelf life and maintain moisture content of the cauliflower 1.

In another example, the post-washing process may include a vacuum cooling step to aid in cooling and drying of the surface the cauliflower 1.

In another example, the post-washing process may include a centrifugal drying step to eliminate unwanted moisture on the surface of the cauliflower 1 produced during the pre-washing and post-washing steps.

In another example, the post-washing process may include a physical coating step to adhere other materials such as cheese, oils, vinegar, malt, extracts, essences, flavorings and preservatives.

In another example, the post-washing process may include a physical coating step to adhere other materials such as vitamins and minerals.

In another example, the post-washing process may include a physical coating step to adhere other materials such as spice admix.

Further, more than one of the above post-washings steps may be combined as part of the process of post-washing S700.

S800 represents a process of packaging the cauliflower 1. In one embodiment, the pulverized cauliflower 8 is injected into a plastic container 10 (see FIG. 3) comprising laminated layers of material such as polyethylene, coextruded polypropylene, and adhesive, whereupon the plastic container 10 is sealed. The plastic container 10 is engineered to meet the respiration requirements of the pulverized cauliflower 8 contained therein. This can be accomplished using one or more of the perforation methods described below. The plastic container 10 is equipped with venting technology allowing steam to release at prescribed temperatures, permitting microwave cooking resulting in a consistent end-product with minimal consumer preparation.

Figure 3:
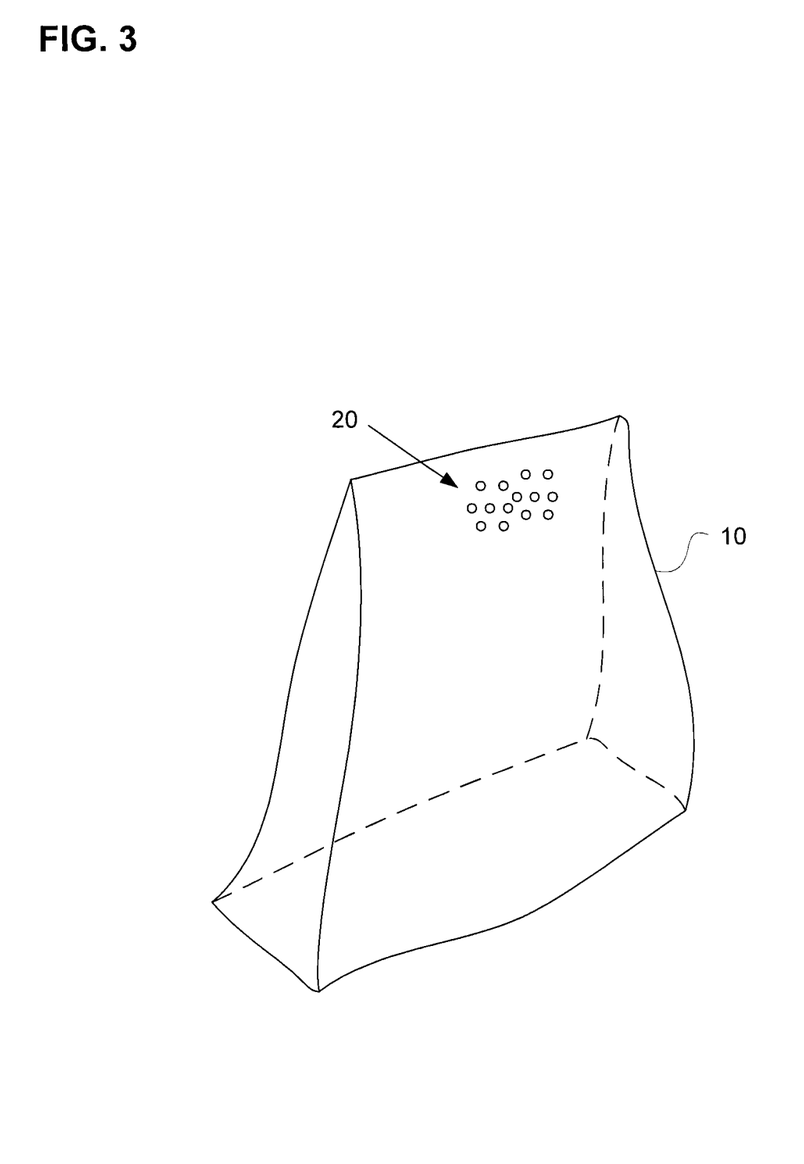
FIG. 3 is a perspective view of a plastic container.

In another example, the pulverized cauliflower 8 is injected into a plastic container 10, the plastic container 10 comprising a monolayer (non-laminated) of polyethylene film.

In another example, the pulverized cauliflower 8 is injected into a rigid plastic container 16, whereupon a film seal 18 (see FIG. 4A and FIG. 4B) or a rigid plastic lid 26 (see FIG. 4C and FIG. 4D) is applied to create a modified internal atmosphere.

In another example, a plurality of perforations 20 is located on the film seal 18 or on the rigid plastic lid 26 applied to the rigid plastic container 16. The plurality of perforations 20 may also be distributed on the rigid plastic container 16. The plurality of perforations 20 may be formed, for example, using laser.

In another example, the plurality of perforations 20 described above may be located near the top, middle, and bottom of the plastic container 10, either on a first surface, a second surface or a combination of the first surface and the second surface. Further, the plastic container 10 may be of a laminated or non-laminated construction.

In another example, the plurality of perforations 20 described above are distributed throughout the top and bottom of the plastic container 10 evenly so as to prevent creation of microatmospheres in the plastic container 10.

In another example, the plurality of perforations 20 described below are distributed in a two thirds (⅔) ratio towards the bottom half of the plastic container 10.

Figure 2B:
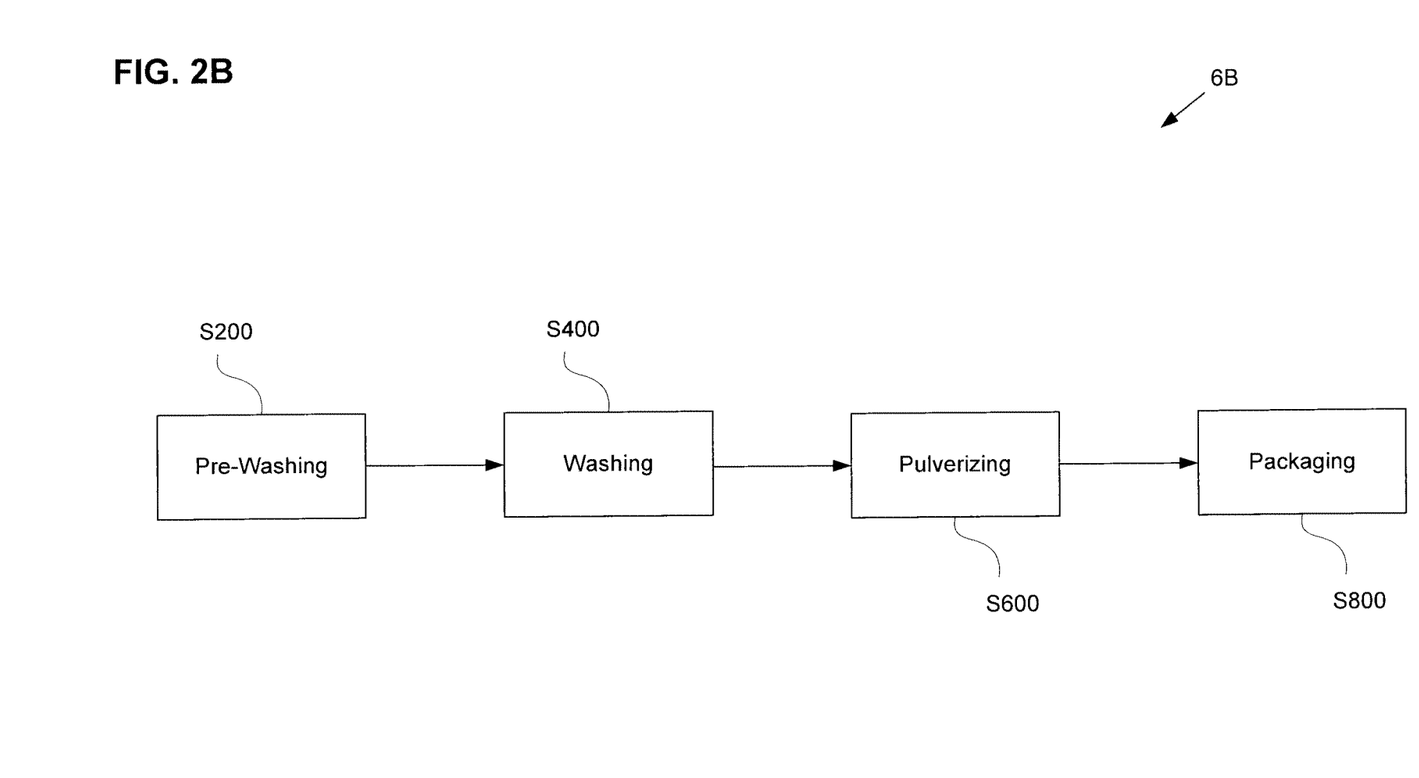
FIG. 2B is a diagram representing a sequence of primary processes of a cauliflower processing method.

FIG. 2B is a diagram representing another exemplary embodiment of a sequence of primary processes of a cauliflower processing method 6B. The primary processes of method 6B are similar to those described with reference to FIG. 2A. However, the sequence of the primary processes differs from the sequence of FIG. 2A. In the embodiment of FIG. 2B, the sequence of primary processes of the cauliflower processing method 6B includes the pre-washing process S200, the washing process S400, the pulverizing (sizing) process S600, and the packaging process S800.

In another example, the sizing process S300 (described by FIG. 2A) may be performed after the pulverizing (sizing) process S600, prior to the packaging process S800.

Figure 2C:
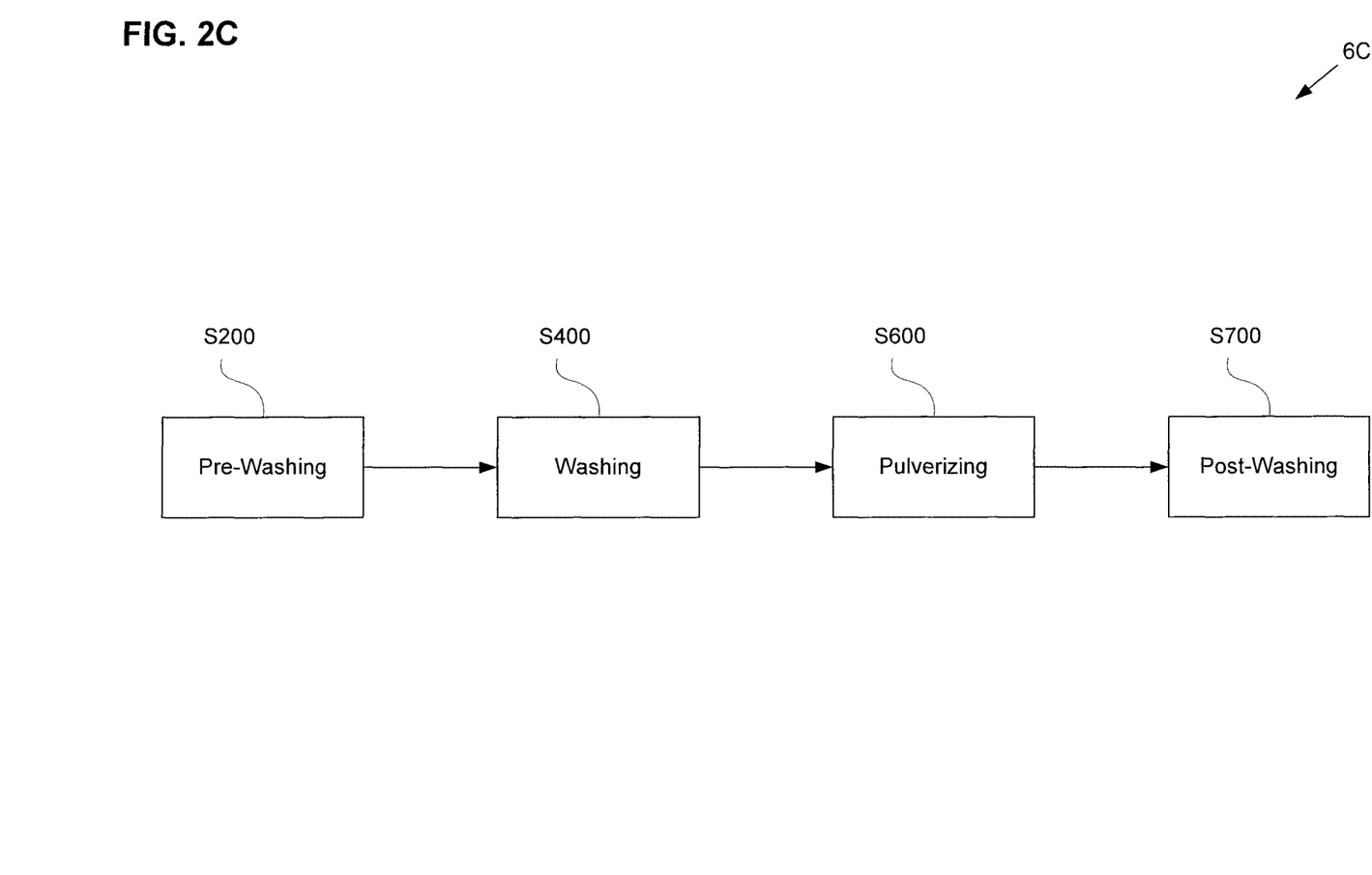
FIG. 2C is a diagram representing a sequence of primary processes of a cauliflower processing method.

FIG. 2C is a diagram representing another exemplary embodiment of a sequence of primary processes of a cauliflower processing method 6C. The primary processes of method 6C are similar to those described with reference to FIG. 2A and FIG. 2B. However, the sequence of the primary processes differs from the sequences of FIG. 2A and FIG. 2B. In the embodiment of FIG. 2C, the sequence of primary processes of the cauliflower processing method 6C includes the pre-washing process S200, the washing process S400, the pulverizing (sizing) process S600, and the post-washing process S700.

FIG. 3 is a perspective view of the plastic container 10. In this embodiment the plastic container 10 is a sealed bag having the plurality of perforations 20. As mentioned above, the plurality of perforations may be distributed on the first surface or the second surface toward the top, middle, or bottom. Further, the plurality of perforations 20 may be distributed evenly on the first and second surfaces of the plastic container 10, or the plurality of perforations 20 may be distributed with a portion of the plurality of perforations 20 concentrated toward a particular portion of the plastic container 10, for example, with about two thirds (⅔) of the perforations located on the bottom half of the plastic container 10.

Figure 4A:
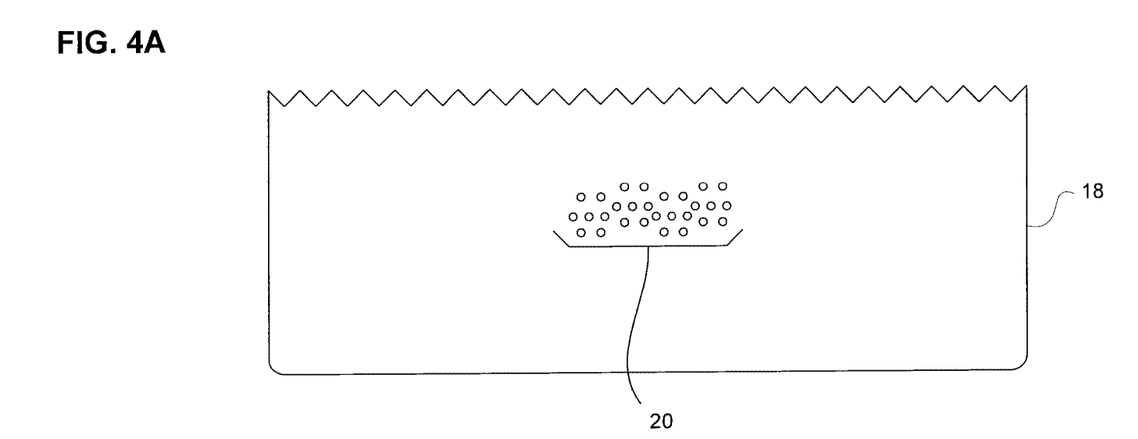
FIG. 4A is a plan view of a portion of a film seal.

FIG. 4A is a plan view of a portion of the film seal 18. In this embodiment the film seal 18 has the plurality of perforations 20 disposed on its surface.

Figure 4B:
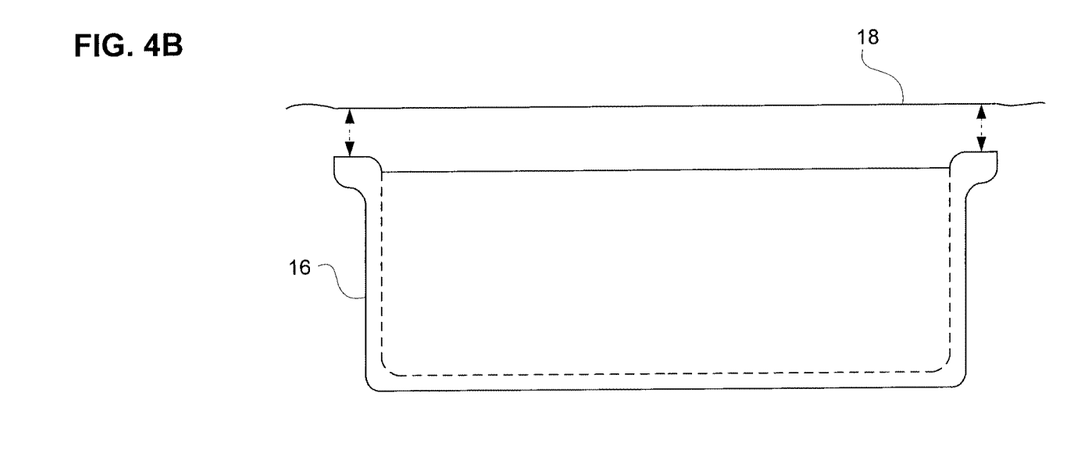
FIG. 4B is a side view of a rigid plastic container.

FIG. 4B is a side view of the rigid plastic container 16. In this embodiment the film seal 18 is disposed above the rigid plastic container 16, and the film seal 18 is connected around the top perimeter of the rigid plastic container 16, sealing the contents of the rigid plastic container 16.

Figure 4C:
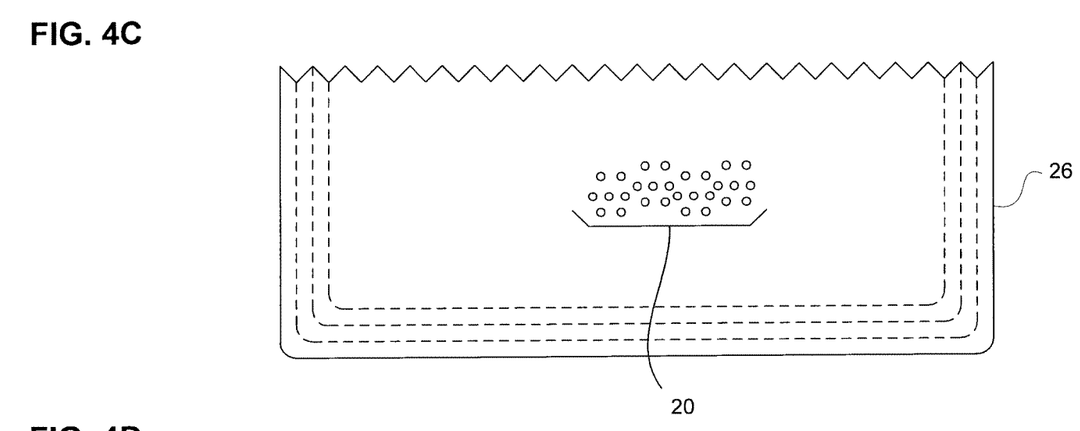
FIG. 4C is a plan view of a portion of a rigid plastic lid.

FIG. 4C is a plan view of a portion of the rigid plastic lid 26. In this embodiment the rigid plastic lid 26 has the plurality of perforations 20 disposed on its surface.

Figure 4D:
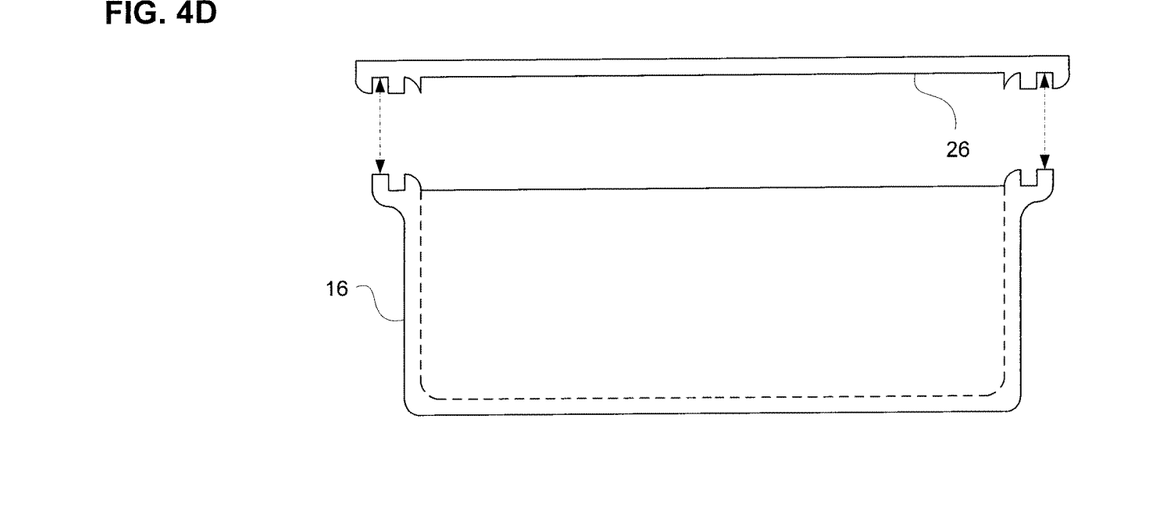
FIG. 4D is a side view of a rigid plastic container.

FIG. 4D is a side view of the rigid plastic container 16. In this embodiment the rigid plastic lid 26 is disposed above the rigid plastic container 16, the rigid plastic lid 26 and the rigid plastic container 16 are connected around the top perimeter of the rigid plastic container 16, sealing the contents of the rigid plastic container 16.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, defines, in part, the scope of the foregoing claim terminology such that no inventive subject matter is dedicated to the public.

What is claimed is:

1. A method for processing cauliflower, the method comprising:
   pre-washing at least a portion of a cauliflower containing a stem portion and a crown portion, including removing unwanted dust, residual, and debris from the cauliflower;
   washing at least the portion of the pre-washed cauliflower with a wash solution containing at least one of sodium hypochlorite, calcium hypochlorite, organic acids, chlorine dioxide, silver ion, water treated with ozone, water treated with pulsed electric field, and water treated with ultraviolet radiation;
   sizing at least the portion of the cauliflower, including at least one of the steps of grinding, sanding, crushing, cutting, scoring and breaking, and hydraulically fracturing and instantaneously vacuum drying the stem portion of the cauliflower and the crown portion of the cauliflower, wherein the sizing is performed on both the stem portion of the cauliflower and the crown portion of the cauliflower; and
   packaging the cauliflower comprising the stem portion and the crown portion of the cauliflower together in a container
   wherein the sizing treats the cauliflower stem so that the stem mimics the visual and tactile effects of the crown portion prior to processing, and the stem and the crown portions in the container are indistinguishable in visual appearance.

2. The method of claim 1, wherein:
   the pre-washing includes at least one of the steps of slicing, cutting, chopping, and dicing of at least the portion of the cauliflower.

3. The method of claim 1, wherein:
the pre-washing includes at least one of the steps of applying whiteners and applying rinses and coatings to at least the portion of the cauliflower.

4. The method of claim 1, wherein:
the pre-washing includes at least one of the steps of grinding, sanding, and crushing at least the portion of the cauliflower.

5. The method of claim 1, wherein:
the washing includes removing debris from at least the portion of the cauliflower using the wash solution and at least one of a bathing, submersion, and rinsing mechanism.

6. The method of claim 1, wherein:
the washing includes at least one of the steps of applying whiteners and applying rinses and coatings to at least the portion of the cauliflower.

7. The method of claim 1, wherein:
the sizing includes adding a spice admix to at least the portion of the cauliflower.

8. The method of claim 1, wherein:
the sizing includes at least one of the steps of marking and notching at least the portion of the cauliflower.

9. The method of claim 1, further comprising:
the sizing of at least the portion of the cauliflower, including at least one of the steps of using a screen, a camera, visual inspection, and automatic robotic feeler gauges.

10. The method of claim 9, wherein:
the sizing includes identifying at least the portion of the cauliflower of dimensions with an approximate maximum size of 1500 mm$^3$ to a minimum size of 15 mm$^3$.

11. The method of claim 4, wherein:
the sizing includes identifying at least the portion of the cauliflower with dimensions within approximately 250 mm$^3$ plus or minus 50 percent.

12. The method of claim 1, further comprising:
after the washing, a step including at least one of the steps of vacuum cooling and centrifugal drying at least the portion of the cauliflower.

13. The method of claim 1, further comprising:
after the washing, a step including physically coating at least the portion of the cauliflower with at least one of a spice admix, a cheese, an oil, a vinegar, a malt, a flavoring, a preservative, and a vitamin and mineral admix.

14. The method of claim 1, further comprising:
injecting at least the portion of the cauliflower into a plastic container;
sealing the plastic container; and
perforating the plastic container with a plurality of perforations.

15. The method of claim 1, further comprising:
after the washing, a step including at least one of the steps of removing unwanted small particles of cauliflower material, and treating at least the portion of the cauliflower with a substance including at least one of an antimicrobial, a preservative, a whitener, and a chemical coating.

* * * * *